June 2, 1931.    H. W. WEBB    1,808,194

PREPARATION OF FLEXIBLE CABLES

Filed Jan. 5, 1928

Inventor
Hartwell W. Webb
By Blackmore, Spencer & Tinli
Attorneys

Patented June 2, 1931

1,808,194

UNITED STATES PATENT OFFICE

HARTWELL W. WEBB, OF FLINT, MICHIGAN, ASSIGNOR TO A C SPARK PLUG COMPANY, OF FLINT, MICHIGAN, A COMPANY OF MICHIGAN

PREPARATION OF FLEXIBLE CABLES

Application filed January 5, 1928. Serial No. 244,606.

This invention relates to flexible cables or shafting of the multistrand type, and has particular reference to the type of shafting used for driving speedometers of automotive vehicles.

In the past some difficulty and inconveniences have been experienced in properly shaping the end of the shaft so that it may be readily applied to the source of power and to the instrument to be operated. The cables have had applied to their round ends the usual tips which have been secured by means of screws or rivets, or solder has been applied and the ends of the cable have also been deformed so as to give the individual strands a permanent set to prevent their unraveling, but these methods have not proved satisfactory. In addition, in giving the cable end the permanent set, the individual strands have been weakened, which accordingly weakens the shaft as a whole.

It is the object of the present invention to overcome difficulties of this kind and to construct a shafting which will have its end portion so formed that it will not weaken the shaft, and will readily lend itself to the application of the tip, or to the source of power or instrument.

The object of the invention is accomplished by heating, preferably between two electric terminals, a short section of the cable and thereby causing the section to be simultaneously uniformly heated throughout its entire transverse section, causing the steel surfaces of the individual strands to oxidize and roughen. During this heating process (which is gradual and uniform at all points of the transverse section) the twist and spring hardness in the individual strands and in the cable as a whole at the heated section will be substantially destroyed, but without materially weakening the cable itself. The roughening of the individual strands due to their oxidation and the destruction of the twist and spring hardness will give a permanent set to the cable at the heated section and prevent any unraveling or fraying of the ends when cut. The cable is not heated to such a degree that a weld is formed but only sufficiently to allow the surfaces of the strands to become oxidized and to destroy the spring hardness. This process will bring about in the cable a condition similar to that existing between the wool fibres of woolen cloth instead of the action of cotton fibres in a cotton fabric.

After the heating process and severing is finished, the ends of the strands at the heated section will stick together and can be relatively easily picked apart by a suitable sharp instrument, or at times even by one's fingers. There will, however, at no time be any unravelling at the end.

The electric heating of the section removes from the wires the temper which may have been formed either by the usual process of tempering steel or by the cold working of the steel. The heated section of the wire is therefore allowed to go through an annealing process after leaving the terminals of the electrical machine and this annealing is preferably accomplished by air cooling.

If desired, the section of the cable may be heated to a temperature such that the individual strands will be welded together or caused to adhere molecularly, although a pure weld is not as desirable as the process previously described.

While the metal is still in its heated condition or after it has cooled, it is cut at the heated portion in a machine having a knife whose edges are so arranged that the individual strands of the wire will not project from the periphery at the end after the cut is made. In other words, the strands at the cut will be drawn toward the core of the cable.

The ends of the cable lengths after cooling are placed in a die so as to give the end a squared formation, by hammering between suitable dies in a manner well known in the art, the term squared being used to indicate not only a four-cornered section, but any polygonal section. If desired the squaring may be done while the cable is hot although this is not essential and it is preferably squared after it is cold. This squared section is preferably slightly tapered toward the end as the frustrum of a pyramid so that it may be readily inserted into the opening of a tip which is usually applied to the end of the cable. This tip may be omitted and the squared end applied directly to the instrument or source of power. If desired, the tip may be applied directly to the cable and as it leaves the electrode, no squaring being necessary.

Figure 1:
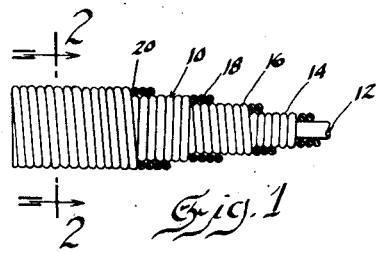
Figure 1 shows a view of a multistrand flexible cable or shafting to which my invention is applied.
Figure 2:
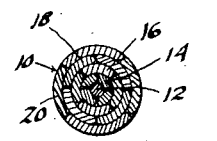
Figure 2 is a section through the cable taken on the line 2—2 of Figure 1.

Referring to the numbered parts on the drawing, 10 indicates a conventional type of multistrand flexible cable or shafting having the central core wire 12 and the outer wires 14, 16, 18 and 20 wound thereon. These individual wound wires, it is to be observed, are wound on the core 12 in alternate opposite directions in order to give the proper strength and stiffness to the cable and so that the shaft will have a minimum of torsional deformation for rated loads which is especially desirable for speedometer drive shafts, shafts for driving dental drills, or for shafts any other purposes for which a flexible drive cable may be needed.

The shafting 10 as it comes from the machines is in very long lengths, and in order to adapt it to the trade for use on speedometer drives, dental drills, etc., it is necessary to cut it into suitable lengths. If cut directly as taken from the machine, the individual windings 14, 16, 18 and 20 will unravel and leave a frayed end. It is, therefore, necessary to adopt some means to prevent the unraveling of the individual strands.

Figure 3:
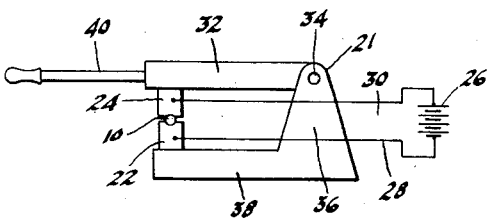
Figure 3 is a side view of the electrical machine for heating or welding a section of the cable.
Figure 4:
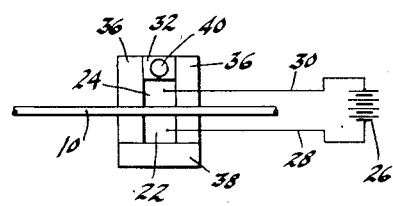
Figure 4 is a front view of the machine shown in Figure 3.

In Figures 3 and 4 is shown an electrical machine 21 having terminals 22 and 24 supplied with a current from a suitable source as shown at 26. The source of electrical energy 26 has the leads 28 and 30 which pass to the electrodes 22 and 24 respectively. The upper electrode 24 is secured to and suitably insulated from an arm 32 pivoted at 34 to an upright 36 forming a part of the base 38 of the machine. This arm 32 is provided with an operating handle 40 by means of which it may be raised to remove the wire 10 or lowered to bring the electrode 24 into contact with a new section of the wire. The lower electrode is rigidly mounted on and suitably insulated from the base 38.

With the contacts in the position shown in Figures 3 and 4, a current will pass between the electrodes and through the wire 10 causing a section thereof to become heated but not to such a degree of intensity as to form a weld or cause the individual strands of the cable to adhere molecularly. This heating between the electrodes is such that the transverse section of the cable will be simultaneously uniformly heated at all points and to a temperature such that the steel surfaces of the individual wires or strands will be caused to oxidize and thereby become roughened. The arm 32 is then raised and the wire moved toward the cutter, or removed from the electrical machine and the heated section annealed in any suitable way, preferably by air cooling.

During the heating between the electrodes, the individual cables are not welded, but are merely heated sufficiently to substantially destroy the twist and spring hardness of the strands which are capable of relatively easy separation by the use of a suitable sharp instrument or may even be separated by one's fingers. The roughening due to the oxidation and the destruction of the twist and spring hardness in the cable due to the heating will result in a permanent set being given the cable at the heated section, and this permanent set will be uniform throughout the entire transverse section.

If desired, the heating between the electrodes may be allowed to proceed to a degree such that a weld will be formed at the heated section and the individual strands caused to molecularly adhere into one homogeneous whole.

Figure 5:
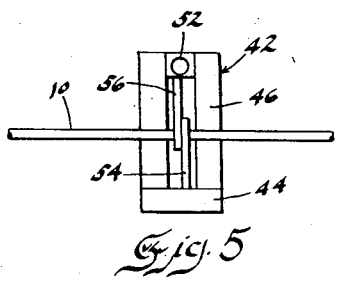
Figure 5 is a front view of the machine for cutting the cable.
Figure 6:
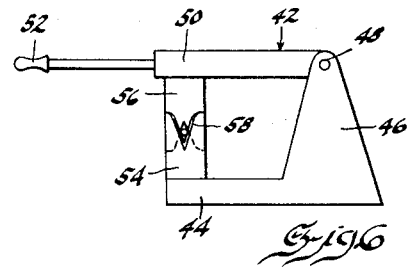
Figure 6 is a side view of the machine shown in Figure 5.

The wire 10 is now passed to the cutter 42 shown in Figures 5 and 6, and the actual cutting may take place either while the section is hot or after it has cooled. This cutter comprises the base 44 having an upright 46 at one end. To the upright 46 there is pivoted at 48 an arm 50 having secured thereto an operating handle 52 so that the arm 50 may be raised and lowered to permit of the insertion and cutting of the wire. The base 44 has secured thereto a V-shaped knife blade or cutter 54, while the pivoted arm 50 has secured thereto a similarly shaped knife blade 56. The cutting edges of these blades are slightly tapered as shown at 58 in Figure 6 so that as the upper knife 56 is forced downwardly to sever the wire, the beveled edges will cause the individual strands to bend toward the center and thereby prevent any projecting stub edges at the wire's periphery. Blades of this character are to be preferred because they will tend to draw the ends of the individual strands toward the center of the cable, although any suitable blade or cutter may be used.

If desired the welding machine 21 and the cutter 42 may be placed in parallel alignment so that the wire may be passed longitudinally from the heating operation to the cutting operation.

Figure 7:
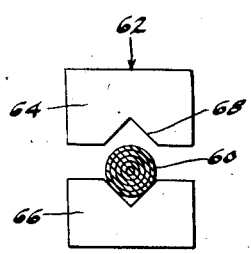
Figure 7 shows the die used for forming a squared section on the cable.
Figure 8:
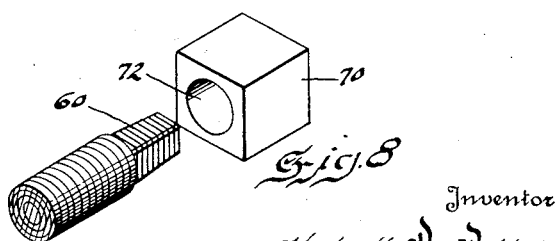
Figure 8 shows the tapered squared end section ready to be applied to a tip.

The severed ends 60 of the wire are then placed in a die 62, preferably formed in two parts 64 and 66, as shown in Figure 7 and which may be placed in and operated from any suitable machine. These die halves are forced together over the relatively round cold end of the cable and are for the purpose of properly shaping the end of the length of cable so that it may be applied to the source of power or to the instrument. In Figure 8, I have shown the end 60 having a squared section to conform to the correspondingly shaped sections 68 of the die halves 64 and 66. While I have termed the section a squared section, it is to be understood by squared is meant any polygonal section. The squared end of the shaft is preferably slightly tapered in order that it may be readily inserted in a tip.

Referring to Figure 8, it will be seen that the squared end 60 is ready to be inserted into the tip 70, the opening 72 of which may be of any suitable shape. The shape of this opening is shown to be round in Figure 8, although it may be square or of any other polygonal formation. This tip is forced on by pressure and may be additionally secured in any suitable way.

After the tips 70 are applied, the cable lengths are ready for use and may be attached to any suitable connection. While I have shown a tip for use in connection with the cable lengths, such tip is not necessary for the reason that the squared end of the cable or shafting may be applied with equal facility directly to the instrument or source of power.

I claim:

1. The method of preparing multistrand cable or shafting consisting of electrically heating a section of said cable or shafting until it oxidizes, annealing the section, and then cutting at the heated section while it is in the heated state.

2. The method of preparing multistrand cable or shafting consisting of heating a section of said cable or shafting until it oxidizes and roughens, annealing the section, and then cutting the section while still in its heated condition.

3. The method of preparing a multistrand cable or shafting consisting in electrically heating a section of said cable or shafting until the tendency thereof to unravel has been destroyed, annealing the section, cutting the section while in the heated state, and then squaring the ends.

4. As an article of manufacture, a multistrand cable having ends, and a roughened surface on the individual strands of said ends, said individual strands having the twist and/or spring tension at the ends substantially removed, whereby unravelling is prevented.

5. The method of preparing multistrand wire cable or shafting consisting of heating a portion of the cable simultaneously uniformly throughout its transverse section until the tendency thereof to unravel has been destroyed, allowing the portion to anneal, and then severing at the heated section before it has cooled.

6. The method of preparing flexible cable or shafting consisting in electrically heating a section of the cable or shafting until it oxidizes, allowing the oxidized surface to anneal and then severing at the heated section.

7. The method of preparing multistrand wire cable or shafting consisting of heating a portion of the cable simultaneously uniformly throughout all parts of the transverse section, then annealing the section until the tendency thereof to unravel has been destroyed, and then severing at the heated section after cooling.

8. The method of preparing a multistrand metal cable or shaft consisting of heating a portion of said cable or shaft simultaneously uniformly throughout its transverse section until the strands are roughened at said portion, and then cutting the cable at said portion, leaving ends which will not unravel.

9. The method of preparing a multistrand metal cable or shaft consisting of electrically heating a section of said shaft or cable until the tendency thereof to unravel has been destroyed, and then cutting the cable at said portion, leaving free ends which will not unravel.

10. The method of preparing a multistrand cable or shaft consisting of heating a portion of said cable or shaft simultaneously uniformly throughout its transverse section until the tendency thereof to unravel has been destroyed, then cutting the cable at said portion, leaving ends which will not unravel, and then applying tips to the ends.

11. The method of preparing a multistrand cable or shafting consisting of electrically heating a section of said cable or shafting until the strands are roughened at said section, annealing the section, cutting the section while in the heated state, and then squaring the ends, said squaring taking place after the ends have cooled.

12. The method of preparing multistrand cable or shafting consisting of electrically heating a section of the cable or shafting until the tendency thereof to unravel has been destroyed, annealing the section, then cutting the section while in a heated state so that there will be no projecting ends at the circumference, and then squaring the cut ends.

13. The method of preparing multistrand cable or shafting consisting of electrically heating a section of the cable or shafting until the tendency thereof to unravel has been destroyed, annealing the section, then cutting the section while in a heated state so that there will be no projecting ends at the circumference, and then squaring the cable or shafting ends after said ends have cooled.

14. The method of preparing multistrand wire cable or shafting, consisting of electrically heating a portion of the cable simultaneously uniformly throughout its transverse section until the tendency thereof to unravel has been destroyed, allowing the portion to anneal, and then severing at the heated section.

15. The method of preparing multistrand wire cable or shafting, consisting of heating a portion of the cable simultaneously uniformly throughout its transverse section, said heating continuing until the individual strands are oxidized on their surfaces, allowing the portion to anneal, and then severing at the heated section.

16. The method of preparing multistrand wire cable or shafting, consisting of heating a portion of the cable simultaneously uniformly throughout its transverse section, said heating continuing until the individual strands are roughened on their surfaces due to oxidation, allowing the portion to anneal, and then severing at the heated section.

17. The method of preparing multistrand wire cable or shafting, consisting of heating a portion of the cable simultaneously uniformly throughout its transverse section, said heating continuing until the individual strands are roughened on their surface due to oxidation and until the tension or twist in the wire is destroyed, allowing the portion to anneal, and then severing at the heated section either before or after it has cooled.

18. The method of preparing multistrand wire cable or shafting consisting of heating a portion of the cable simultaneously uniformly throughout its transverse section, said heating continuing until the individual strands are caused to stick together due to roughened surfaces produced by oxidation brought about by the heating, allowing the portion to anneal, and then severing at the heated section.

19. The method of preparing flexible cable or shafting consisting in electrically heating a section of the cable or shafting until it oxidizes, allowing the oxidized surface to anneal, then severing at the heated section, and then squaring the end of the cable.

20. The method of preparing flexible cable or shafting consisting in electrically heating a section of the cable or shafting until it oxidizes, allowing the oxidized surface to anneal, then severing at the heated section, then squaring the severed ends, and then applying a tip.

21. The method of preparing a multistrand metal cable or shaft consisting of heating a portion of said cable or shaft until the tendency thereof to unravel has been destroyed and then severing the cable at the heated section.

22. The method of preparing a multistrand metal cable or shaft consisting of heating a portion of said cable or shaft until the tendency thereof to unravel has been destroyed, then severing the cable at the heated section, and then squaring the ends.

23. The method of preparing multistrand wire cable or shafting, consisting of heating a section of said cable or shafting until the tendency thereof to unravel has been destroyed, allowing the heated section to anneal, and then cutting the cable at the heated section.

24. The method of preparing multistrand cable or shafting, consisting of electrically heating a section of the cable or shafting until the tendency thereof to unravel has been destroyed, annealing the section, and then cutting the section while in a heated state so that there will be no projecting ends at the circumference.

25. The method of preparing lengths of multistrand cable or shafting consisting of electrically heating a section of said cable or shafting until the tendency thereof to unravel has been destroyed, cutting at the heated section, squaring the cut ends, and then fastening tips.

26. A flexible shaft formed of a plurality of coiled metallic strands normally having a tendency to uncoil, said shaft having an end at which the strands have been given a set without deformation of the strands and such that their tendency to uncoil at said end has been destroyed.

27. A flexible shaft formed of a plurality of coiled metallic strands normally having a tendency to uncoil, said shaft having an end at which the strands have been given a set by treatment with heat of sufficient intensity to destroy their tendency to uncoil at said end.

28. A twisted multistrand metallic flexible shaft having a normal tendency to unravel and having an end at which the strands have been given a set without deformation of the strands and such that the tendency of the shaft to unravel has been overcome.

29. A twisted multistrand metallic flexible shaft having an end heat treated in such manner that the normal tendency of the strands at said end to uncoil has been destroyed without deformation of the strands at said end.

In testimony whereof I affix my signature.

HARTWELL W. WEBB.

CERTIFICATE OF CORRECTION.

Patent No. 1,808,194.　　　　　　　　　　Granted June 2, 1931, to

HARTWELL W. WEBB.

It is hereby certified that error appears in the printed specification of the above numbered patent requiring correction as follows: Page 3, lines 88, 89 and 90, claim 7, strike out the words "until the tendency thereof to unravel has been destroyed" and insert same to follow the word "section" first occurrence, in line 88, of same claim; page 4, line 43, claim 17, strike out the words "either before or after it has cooled" and insert the same to follow the word "section" in line 25, claim 15; and that the said Letters Patent should be read with these correction therein that the same may conform to the record of the case in the Patent Office.

Signed and sealed this 4th day of August, A. D. 1931

(Seal)

Wm. A. Kinnan,
Acting Commissioner of Patents.